(12) United States Patent
Meinrenken et al.

(10) Patent No.: US 9,524,463 B2
(45) Date of Patent: Dec. 20, 2016

(54) METHODS AND SYSTEMS FOR AUTOMATING CARBON FOOTPRINTING

(75) Inventors: Christoph Johannes Meinrenken, New York, NY (US); Klaus S. Lackner, Dobbs Ferry, NY (US); David Joseph Walker, Stamford, CT (US); Robert Christian ter Kuile, Farmers Branch, TX (US)

(73) Assignee: The Trustees of Columbia University in the City of New York, New York, NY (US)

( * ) Notice: Subject to any disclaimer, the term of this patent is extended or adjusted under 35 U.S.C. 154(b) by 889 days.

(21) Appl. No.: 13/578,297

(22) PCT Filed: Feb. 16, 2011

(86) PCT No.: PCT/US2011/025116
§ 371 (c)(1),
(2), (4) Date: Mar. 20, 2013

(87) PCT Pub. No.: WO2011/103207
PCT Pub. Date: Aug. 25, 2011

(65) Prior Publication Data
US 2013/0191313 A1     Jul. 25, 2013

Related U.S. Application Data

(60) Provisional application No. 61/304,800, filed on Feb. 16, 2010, provisional application No. 61/367,165, (Continued)

(51) Int. Cl.
*G06N 5/02*     (2006.01)
*G06Q 10/00*     (2012.01)

(52) U.S. Cl.
CPC ............... *G06N 5/02* (2013.01); *G06Q 10/00* (2013.01)

(58) Field of Classification Search
None
See application file for complete search history.

(56) References Cited

U.S. PATENT DOCUMENTS 6,324,534 B1 * 11/2001 Neal et al.
6,907,424 B1 * 6/2005 Neal et al. .................... 707/706
(Continued)

OTHER PUBLICATIONS

Carbon Trust et al, "Guide to PAS 2050 How to assess the carbon footprint of goods and services Department for Environment Food and Services", First published in the UK in 2008.*
(Continued)

*Primary Examiner* — Stanley K Hill
*Assistant Examiner* — Ilya Traktovenko
(74) *Attorney, Agent, or Firm* — Murtha Cullina LLP; Anthony P. Gangemi

(57) ABSTRACT

Methods and systems for automating carbon footprinting are disclosed. In some embodiments, the methods include a plurality of steps. In some embodiments, related to predetermined resources associated with an item from predetermined data sources is obtained. Then, estimated emission factors are calculated for each of the resourced. Next, a contributory uncertainty of the data and of the emission factors is determined. Then, a user is guided based on a comparison of the respective contributory uncertainty of data related to the resources or emission factors Next, both data related to the resources and the estimated emission factors of the resources are utilized to determine a carbon footprint of the item.

16 Claims, 3 Drawing Sheets

Related U.S. Application Data filed on Jul. 23, 2010, provisional application No. 61/387,218, filed on Sep. 28, 2010.

(56) References Cited

U.S. PATENT DOCUMENTS

| | | | |
|---|---|---|---|
| 2007/0184394 A1* | 8/2007 | Comrie | 431/2 |
| 2008/0040182 A1 | 2/2008 | Wegner et al. | |
| 2008/0121142 A1* | 5/2008 | Comrie et al. | 106/707 |
| 2008/0255899 A1* | 10/2008 | McConnell et al. | 705/7 |
| 2009/0132176 A1* | 5/2009 | McConnell et al. | 702/23 |
| 2009/0164264 A1* | 6/2009 | Zolezzi | 705/7 |
| 2009/0171722 A1* | 7/2009 | Roberts | 705/7 |
| 2009/0177505 A1* | 7/2009 | Dietrich et al. | 705/7 |
| 2009/0307037 A1* | 12/2009 | King | 705/8 |
| 2010/0030608 A1 | 2/2010 | Kaminsky et al. | |
| 2010/0070316 A1* | 3/2010 | Lieberman et al. | 705/7 |
| 2010/0161368 A1* | 6/2010 | Dawson et al. | 705/8 |
| 2010/0249955 A1* | 9/2010 | Sitton | 700/33 |

OTHER PUBLICATIONS

Kenny et al, "Comparative performance of six carbon footprint models for use in Ireland", Environmental Impact Assessment Review 29 (2009) 1-6, Available online Jun. 16, 2008.*

Padgett et al, "A comparison of carbon calculators", Environmental Impact Assessment Review 28 (2008) 106-115, Available online Dec. 21, 2007.*

Singer et al, "Probability distributions for carbon emissions and atmospheric response", Published online: Apr. 22, 2008, Springer Science + Business Media B.V. 2008.*

International Search Report and The Written Opinion of the International Searching Authority, International Application No. PCT/US2011/025116, filed Feb. 16, 2011.

* cited by examiner

METHODS AND SYSTEMS FOR AUTOMATING CARBON FOOTPRINTING

CROSS REFERENCE TO RELATED APPLICATION(S)

This application claims the benefit of U.S. Provisional Application Nos. 61/304,800, filed Feb. 16, 2010, 61/367,165, filed Jul. 23, 2010, and 61/387,218, filed Sep. 28, 2010, each of which is incorporated by reference as if disclosed herein in its entirety.

BACKGROUND

Life cycle analysis (LCA) has been practiced since the 1960s. When in 1969, a well-known beverage company commissioned a comparative study of traditional, re-usable glass bottles vs. plastic bottles, this arguably marked the debut of LCA as integral to product development even for mass market consumer goods and services companies. More recently, the more widespread public awareness of the risks of global warming and the role of anthropogenic green house gas (GHG) emissions has prompted a renaissance of LCA concepts in the form of standardized carbon footprinting (CF) of products and services.

Companies usually seek to quantify CFs for one or more of the following reasons: (i) internal transparency and identification of carbon reduction strategies; (ii) communication of results to external stakeholders such as environmental monitoring groups, or to apply for certification; or (iii) requests from a company's corporate customers for scope 3-relevant data, to use in their corporate carbon accounting.

While LCA has continuously evolved, prompting both often re-cited criticism and improvement, the new need for accurate and comparable CFs has catalyzed efforts to overcome many of LCA's traditional shortcomings and provided standards for CF. Today, companies embarking on CF benefit from detailed protocols, industry/sector specific guidance, software packages, and databases that provide support with the following: (i) choice of functional unit; (ii) system boundaries; (iii) emission factors (EFs) of materials and activities; and (iv) specialty issues such as recycling and biogenic carbon and storage. Crucially, guidelines also provide a more head-on approach to materiality and realistically achievable levels of accuracy. For example, the rounding rules of the UK Carbon Trust imply that even a best-practice CF will have a residual uncertainty of 5-10%.

While the above developments represent tremendous progress and improvements over the status quo even just a few years ago, quantifying the CFs for hundreds or thousands of individual products/services is currently impossible, short of a massive buildup of a company's dedicated personnel and LCA expertise. Specifically, practitioners today face two fundamental obstacles when performing CF at the scale of large companies:

1) required time and expertise: collecting, organizing, and validating LCA inventory (easily hundreds of data items for a single product/service), as well as mapping to EFs, typically takes hundreds of man hours and specialized knowledge; and 2) lack of uniformity and integrated platform: CF today is usually performed as a series of one-off efforts, e.g., using non-interlinked, separate spreadsheets for the CF of each new product/service; once the practitioner has completed data entry and calculation for one product, to the desired accuracy, the practitioner moves on to the next product, often without maximizing the re-use of any previously collected information.

The obstacles related to known LCA practices result in missed opportunities that currently prevent CF from realizing its full spectrum of possible benefits, which include the following:

(1) What-if impacts across products, carbon management, and cost-benefit evaluations: Arguably, one of the greatest opportunities of CF is to enable a company to identify and prioritize reduction strategies. However, because the CFs for a set of different products are usually calculated in a set of non-integrated files, it is difficult to quantify the combined impact of a reduction strategy. For example, counting all impacts on raw materials, transportation, and disposal, what would be the total company-wide GHG reductions if all PET packaging were made 15% lighter? What if all factories in a country moved 30% of their primary energy consumption to hydropower-rich electricity? Which LCA stages in the supply chain—measured across all products or by business line—offer the largest reduction potential? Given an assumed carbon price, would the costs for required upgrades (e.g., modified energy mix, packaging, or ingredients) be a worthwhile investment?

(2) Flexibility vis-à-vis regulatory change: Standards for CF are still evolving. With current practice, a future change in the CF "accounting rules" would mean tremendous time and resource effort on behalf of a company, to essentially fix the manual CF calculations for hundreds of products/services. This poses significant "regulatory" risk.

(3) Synergy with corporate carbon accounting ("corporate footprint"): There is a direct relationship between the various LCA stages that count toward a product/service CF and those that count towards a corporate footprint. Therefore, there are significant synergies between the data collection and analyses for product/service CFs and the scopes 1, 2, and 3 of corporate footprints. Current CF practice often lacks the coverage, uniformity, or transparency that would enable the company to make use of such synergies.

SUMMARY

Methods and systems according to the disclosed subject matter embody one or more of the following three techniques. First, each CF is based on a single, uniform data framework that applies to all products/services. Rather than manually, data is entered, wherever possible, via auto-feeds from existing enterprise data, e.g., BOM (bill of materials) and energy usage at company-controlled factories. This technique minimizes the number of data items that require manual input. Second, particularly for remaining data entries, concurrent uncertainty analysis points the user to those activity data or EFs where additional data or improved accuracy would most improve the accuracy of the calculated CFs. This technique uses manual entries more efficiently. Third, a statistical model approximates EFs, thereby eliminating the manual mapping of a product/service's inventory to the vast selection of EF databases.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
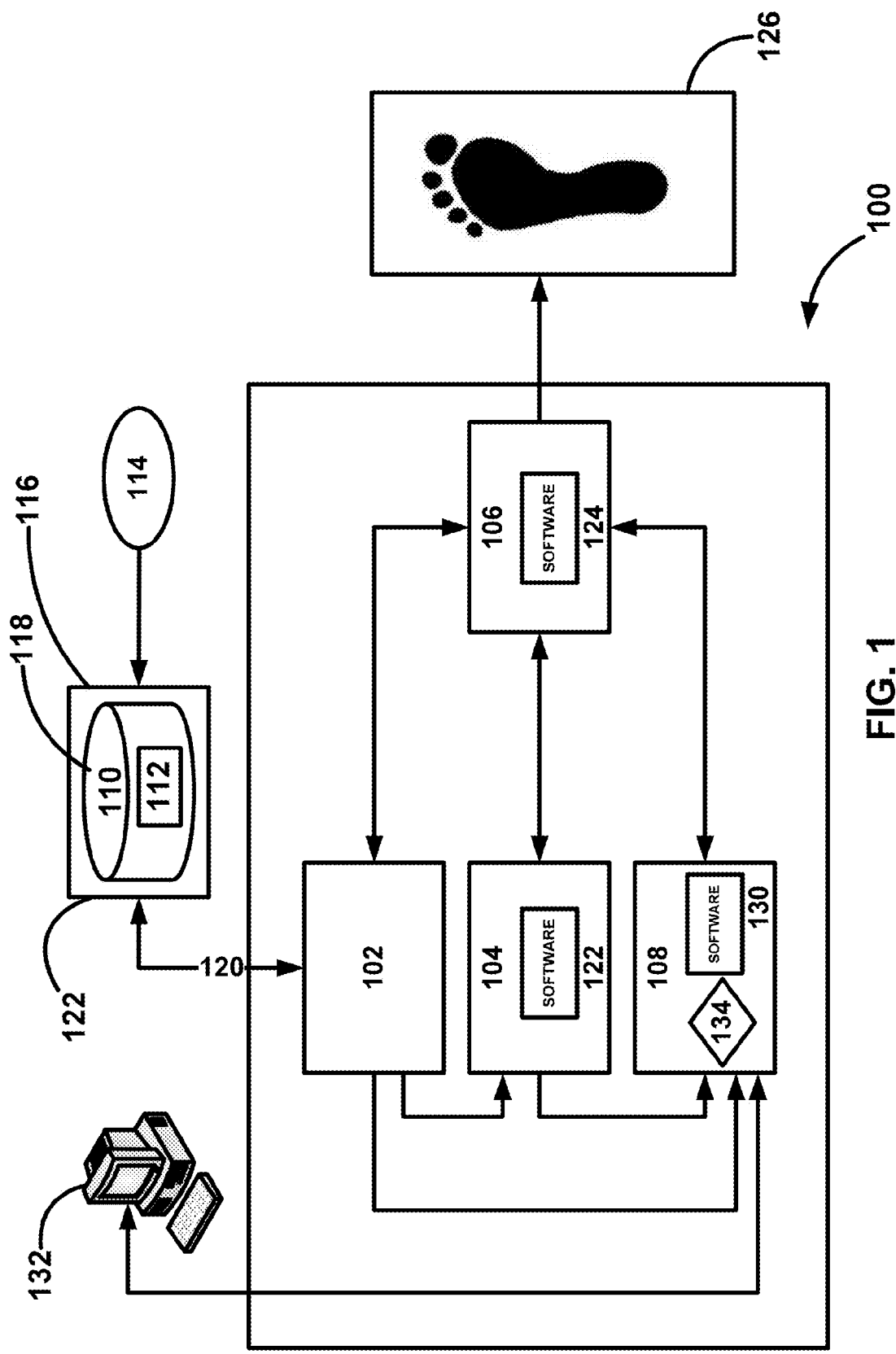
FIG. 1 is a schematic diagram of a system according to some embodiments of the disclosed subject matter.
Figure 2:
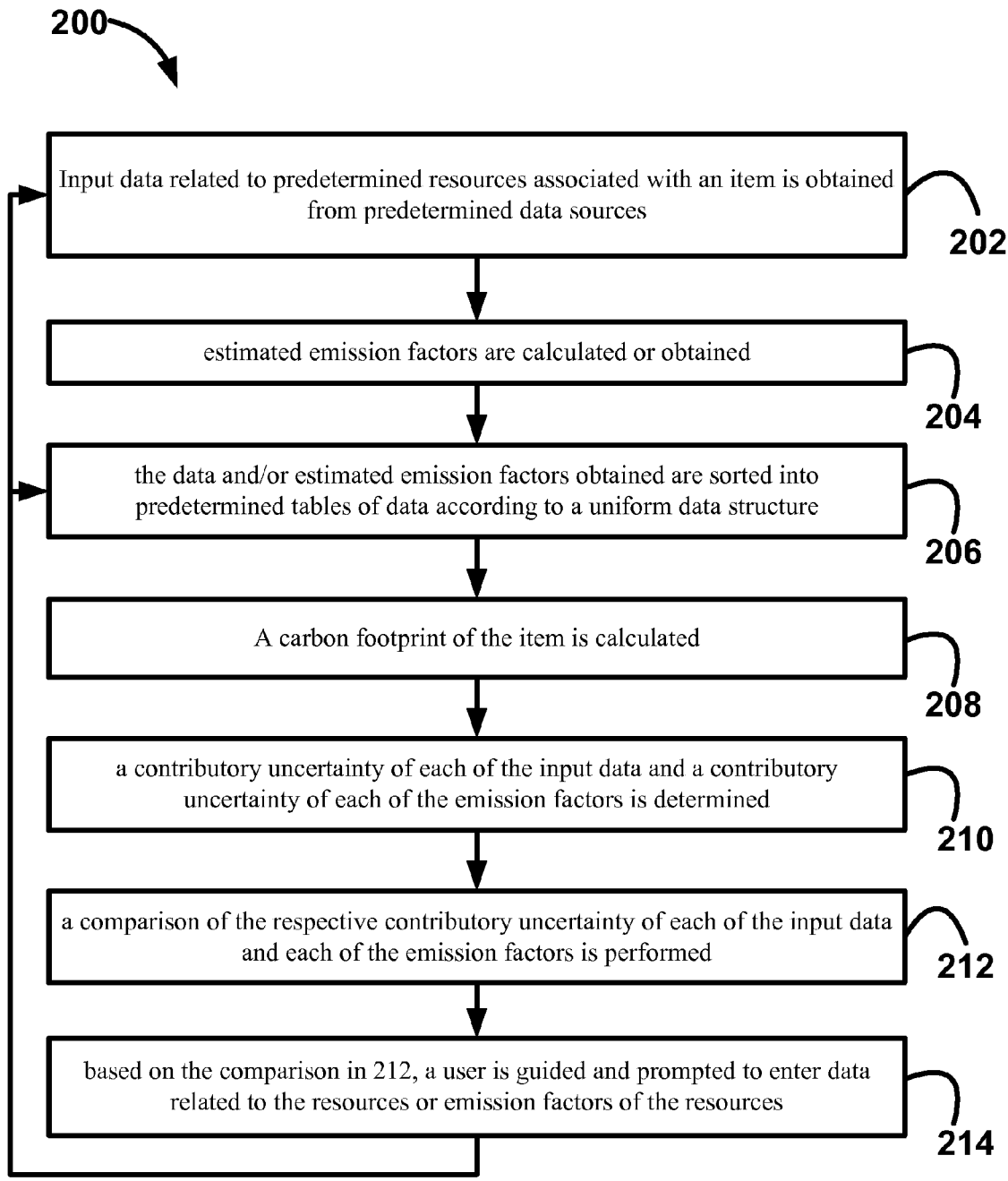
FIG. 2 is a chart of a method according to some embodiments of the disclosed subject matter.

Referring now to FIGS. 1 and 2, some embodiments include systems and methods for automating carbon footprinting. Some embodiments include a system 100 for determining the carbon footprint of an item, such as a product or service. Some embodiments of system 100 include the following cooperating modules that transform data to determine the carbon footprint of an item: a data automation module 102; an emission factor estimator module 104; a calculation module 106; and a user guidance module 108.

Referring now to FIG. 1, data automation module 102 includes mechanisms for obtaining data 110 related to predetermined resources 112 associated with an item 114 from predetermined data sources 116. Resources 112 typically include materials and activities expended during the manufacture or production of item 114. Predetermined data sources 116 typically, but not always, include an enterprise resource planning (ERP) program database 118. Mechanisms for obtaining data 110 include an automated data feed 120 mapped to enterprise resource planning program database 118. Other mechanisms include manual data entry or automated data feeds to myriad databases. In some embodiments, data obtained by automated data feed 120 include data required by emission factor estimator module 104 for calculating the emission factors of resources 112.

Referring now to Table 1, certain data items required for product CFs are generally readily available from existing ERP systems or similar data warehouses.

TABLE 1

Suggested taxonomy of LCA stages and possible data sources.

| LCA Stage | Data source |
| --- | --- |
| Purchased goods - packaging | ERP system or similar data warehouses (specifically "bill of materials"). |
| Purchased goods - other | ERP system or similar data warehouses (specifically "bill of materials"). |
| Transportation - inbound | Usually, manual entries or country-specific default settings (unless available in ERP). Also note that many EFs of purchased goods may be inclusive of the inbound transportation ("to gate"). |
| Production | ERP system or similar data warehouses, such as factory energy consumption monitoring. |
| Transportation - outbound | Usually, manual entries or country-specific default settings (unless available in ERP). |
| Distribution and retail | Usually, manual entries or country-specific default settings (some of which could be based on sector-specific guidance). |
| Use phase | Same as for "distribution and retail". |
| Disposal (end of life) | Usually, manual entries or country-specific default settings. Note these are usually at the level of material classes (such as "glass", "cardboard", "plastic", etc.). |

In some embodiments of the disclosed subject matter, rather than manually entering data manually, conduits control automatic uploads of as many data inputs as possible. This also allows, for example, quarterly updates, which offers the additional advantage of keeping footprint results more up to date than with traditional, labor-intensive models. Where certain purchased goods cannot be mapped across products and to EFs via unique IDs, in some embodiments, fuzzy logic-type mapping is used to maximize automatic entry, e.g., "farm potatoes" used for frozen fries should be mapped to "farm potato" used for crisps, and both should be mapped to the country-relevant EF for "potatoes".

Emission factor estimator module 104 including mechanisms, e.g., software 122, for calculating estimated emission factors for each of resources 112. As described below with respect to FIG. 3, software 122 includes a statistical model that approximates EFs, thereby eliminating the manual mapping of a product/service's inventory to the vast selection of EF databases.

Some embodiments of the disclosed subject matter allow for overrides of automatically obtained data and automatically estimated data/factors on a case by case basis. For example, customized EFs that are based on primary, product-specific data can be manually entered instead of automatically estimated.

Calculation module 106 includes mechanisms, e.g., software 124, for utilizing both data related to resources 112 and the estimated emission factors of the resources to determine a carbon footprint 126 of item 114.

Software 124 includes an algorithm for calculating carbon footprint 126 that interprets table of data related to an item, uses look-ups from all other tables of data, and calculates the CF according to a chosen protocol. In almost all cases, the CF can be represented by a summation over many multiplications, where each multiplication represents the CF contribution from a particular item (equation (1)). Equation (1) is linear in Di (and in the EFs).

Let CF denote the footprint of an item including a product, set of products, or a carbon reduction strategy, driven by a set of input data $D_i$, e.g., transportation distance, electricity consumption, EF, each of which varies by a certain coefficient of variation ($CV_i$) around its mean. We approximate the resulting uncertainty of CF via a sum of its partial derivates:

$$CF \sim \check{CF} := \overline{CF} + \sum_i \Delta CF_i = \overline{CF} + \sum_i (D_i - \overline{D_i}) \cdot \frac{\partial CF}{\partial D_i} \quad (1)$$

Where

CF denotes the footprint with all $D_i$ set to a specific value from their respective distribution, and $\check{CF}$ denotes the approximation of this CF;

$\overline{CF}$ denotes the arithmetic mean of CF (if CF is linear in all $D_i$, then $\overline{CF}$ equals CF when all $D_i$ are set to their arithmetic means $\overline{D_i}$); and $\delta CF/\delta D_i$ denotes the partial derivative of CF by $D_i$, evaluated at $D_i$ set to $\overline{D_i}$.

In some embodiments, system 100 includes user guidance module 108 including mechanisms, e.g., software 130, for determining a contributory uncertainty of the data and contributory uncertainty of the emission factors and for prompting a user 132 to enter data related to resources 112 or emission factors of the resources based on a comparison 134 of the respective contributory uncertainty of data related to the resources and emission factors.

Software 130, which includes an uncertainty algorithm, uses the compounded uncertainty of the total CF (of a roll-up or carbon reduction scenario), which is calculated using Equation (1). Equation (1) represents a simple sum, where the variance of $\overline{CF}$ equals zero and the variance of each $\Delta CF_i$ equals the square of $$CV_i \cdot \overline{D_i} \cdot \frac{\partial CF}{\partial D_i}.$$

Based on standard stochastics, the variance of a sum across (uncorrelated) components equals the sum of the variances of each component, whether the distribution of the components are Gaussian or not. Furthermore, since CF is linear in $D_i$, we can rewrite the partial derivatives as finite differences of CF evaluated at different values of each $D_i$. Thus we obtain:

$$CV_{\widehat{CF}} = \frac{\sqrt{\sum_i [CF(\overline{D_i} + \overline{D_i} \cdot CV_{D_i}) - \overline{CF}]^2}}{\overline{CF}} \quad (2)$$

Where
$CV_{\widehat{CF}}$ denotes the CV of the (approximated) CF
$CV_{D_i}$ denotes the CV of $D_i$
$CF(\overline{D_i} + \overline{D_i} \cdot CV_{D_i})$ denotes CF evaluated at $\overline{D_j}$ plus one standard deviation (and all other $D_j$ at $\overline{D_j}$).

Equation (2) is essentially the sum across the squares of individual "impacts" (followed by square root and division by CF), where each such impact is the change in CF if one Di is increased by one standard deviation (while all others are kept at their mean, i.e., "ceteris paribus").

In addition to determining the uncertainty of the CF calculation. In some embodiments, the uncertainty of each data input is determined as it is input, which enables the overall quality of the inputs to be increased in real time. By way of example, Equation (2) allows one to calculate that the CF of a bag of potato chips is 110 g CO2e±18%. Assuming that such a CF calculation is driven by 3 uncertain inputs, e.g., the number of kWh consumed during production, the EF of the packaging material, and the (average) transportation distance from factories to stores, to reduce the CV of the CF to something more accurate, it is helpful to break the CV down into the contributions from each driver, i.e., to learn which one of the three inputs contributes the most to the CV and which one the least. As follows, time/effort can then be focused on improving the accuracy of the inputs that have the biggest impact on the accuracy of the overall footprint, e.g., of a product, set of products, or carbon reduction strategy. In some embodiments, to allocate the CV of the total CF based on each inputs (Di's) contribution to the variance, the following Equation (3) is used:

$$CV_{c,D_i} = CV_{\widehat{CF}} \cdot \frac{[CF(\overline{D_i} + \overline{D_i} \cdot CV_{D_i}) - \overline{CF}]^2}{\sum_j [CF(\overline{D_j} + \overline{D_j} \cdot CV_{D_j}) - \overline{CF}]^2}$$

$$= \frac{[CF(\overline{D_i} + \overline{D_i} \cdot CV_{D_i}) - \overline{CF}]^2}{CV_{\widehat{CF}} \cdot \overline{CF}^2};$$

Where $CV_{C,Di}$ denotes the contribution of input driver $D_i$ to the total uncertainty $CV_{\widehat{CF}}$; and
All others as above.

Using Equation (3), the contributory CVc, Di sum up to the CV of CF, which is typically less than 100%, e.g.: the CV of the electricity consumption contributes 1%, the CV of the transportation distance 6%, and the CV of the packaging EF 11%. The CV contribution, as defined above, is sensitive to both the CV of a driver Di as well as the driver's absolute impact on CF.

In some embodiments, the data obtained by data automation module 102 is sorted into predetermined tables of data thereby defining a uniform data structure. In addition to the overall data structure described in Table 1, in some embodiments, data is organized into distinct look-up tables. These look-up tables reflect redundancy in the data, such that each CF essentially becomes a permutation of various elements in the tables. Note that most tables store two sets of data, one for the mean and one for the associated uncertainty of the respective datapoint.

In some embodiments, the look-up tables include the following five distinct look-up tables (A)-(E):

(A) Products: This table stores inventory for all LCA stages, for all items, i.e., products/services of a company. It covers material and activity data such as amounts of purchased goods, including scrap, spillage, etc., production and distribution, transportation routes, and use-phase characteristics. In addition, table A stores product attributes such as country, brand, business line, and annual production volume (to report roll-ups and breakdowns of the CFs by various characteristics).

(B) Assemblies: This table stores information on those materials and activities that constitute sub-products or sub-services in themselves. For example, an assembly may specify that a kg of oranges specified in table A refers to a set of purchased goods (fertilizers, manure, pesticides) and activities (fertilizing, pruning, harvesting). Practitioners will have to maintain the information for such assemblies only once, and then all products that use oranges from the same supplier are mapped to the same assembly.

(C) Purchased goods library: This table stores material-level meta information to further specify each purchased good contained in either table A or table B, for example to determine EFs.

(D) EFs: This table stores EFs for any purchased good (ingredients, packaging) and activity occurring in either table A or table B. Note that some practitioners employ EFs at the level of assemblies. While this facilitates calculating a CF, e.g., instead of adding up multiple items in the assembly, simply multiply Weight$_{Orange}$×EF$_{Orange}$, it obscures granular reporting of the resulting CF by purchased good, production, transportation, and thus reduces the usefulness of the resulting analyses with regards to carbon reduction strategies.

(E) Standards & defaults: This table stores global and country-specific default values as described above.

In some embodiments of system 100, at least a portion of the data obtained by data automation module 102 and the emission factors of resources 112 determined by emission factor estimator module 104 is generated via an estimate based on data and emission factors related to similar materials and activities. For example, in some embodiments, the estimate includes averaging data and emission factors related to similar materials and activities.

Some embodiments of the disclosed subject matter include self-learning look-up tables. By quantifying contributory uncertainties at all stages of the CF calculation, the system can automatically select the available data entries with the lowest contrinutory uncertainty without separate user intervention thereby expediting the calculation. For example, in some embodiments, the parameters for the CF estimates are automatically updated to always reflect any recently added bottom-up CFs. Similarly, instead of the default plant-to-store distance in a given country, in some embodiments, the system utilizes the average respective distance from any other products in that country that were already characterized bottom up, as soon as the associated uncertainty of that sample falls below the one specified for the default distance.

Some embodiments of the disclosed subject matter include the use of wizards. The uniform data structure facilitates the creation of assisted-data-entry tools such as wizards to guide users through quantifying the CF for any product/service. This is especially helpful for analyzing or developing new products whose data is not yet available through ERP-systems or similar data warehouses and therefore must be entered manually.

Referring now to FIG. 2, some embodiments of the disclosed subject matter include a method 200 for determining the carbon footprint of an item such as a product or service. At 202, input data related to predetermined resources associated with an item is obtained from predetermined data sources. Resources associated with an item typically include materials and activities expended or conducted in the manufacture or generation of the item. Predetermined data sources include data from an enterprise resource planning program database, at least a portion of which is provided via an automated data feed that is mapped to the database. As used herein, enterprise resource planning program is broadly defined to include any types of programs and databases that include similar types of enterprise data. In some embodiments, method 200 includes the use of fuzzy logic to identify particular data in the enterprise resource planning program database. At 204, estimated emission factors are calculated or obtained. For the estimated emission factors that are calculated, the calculations include data obtained by the automated data feeds. At 206, the data and/or estimated emission factors obtained are sorted into predetermined tables of data according to a uniform data structure. At 208, utilizing both data related to the resources, the estimated emission factors calculated, and predetermined emission factors obtained, a carbon footprint of the item is calculated. At 210, a contributory uncertainty of each of the input data and a contributory uncertainty of each of the emission factors is determined. At 212, a comparison of the respective contributory uncertainty of each of the input data and each of the emission factors is performed. In addition to guiding a user to enter data, in some embodiments, the comparison in 212 is the decision basis to choose between many different possible candidates/sources for data inputs, such as data input from another user, data from another predetermined source, data from another estimating algorithm, and averages of other already existing data inputs. For example, in some embodiments, data related to the resources or emission factors of the resources is automatically obtained via an automated data feed or automatically generated via calculations based on a comparison of the respective contributory uncertainty of data related to the resources or emission factors. Over time method 100 and related systems become self-learning and evolving as their databases grow. At 214, based on the comparison in 212, a user is guided and prompted to enter data related to the resources or emission factors of the resources. Then, at 206, data entered is sorted into predetermined tables of data according to a uniform data structure. In some embodiments, the data entered is used to recalculate estimated emission factors at 204.

Figure 3:
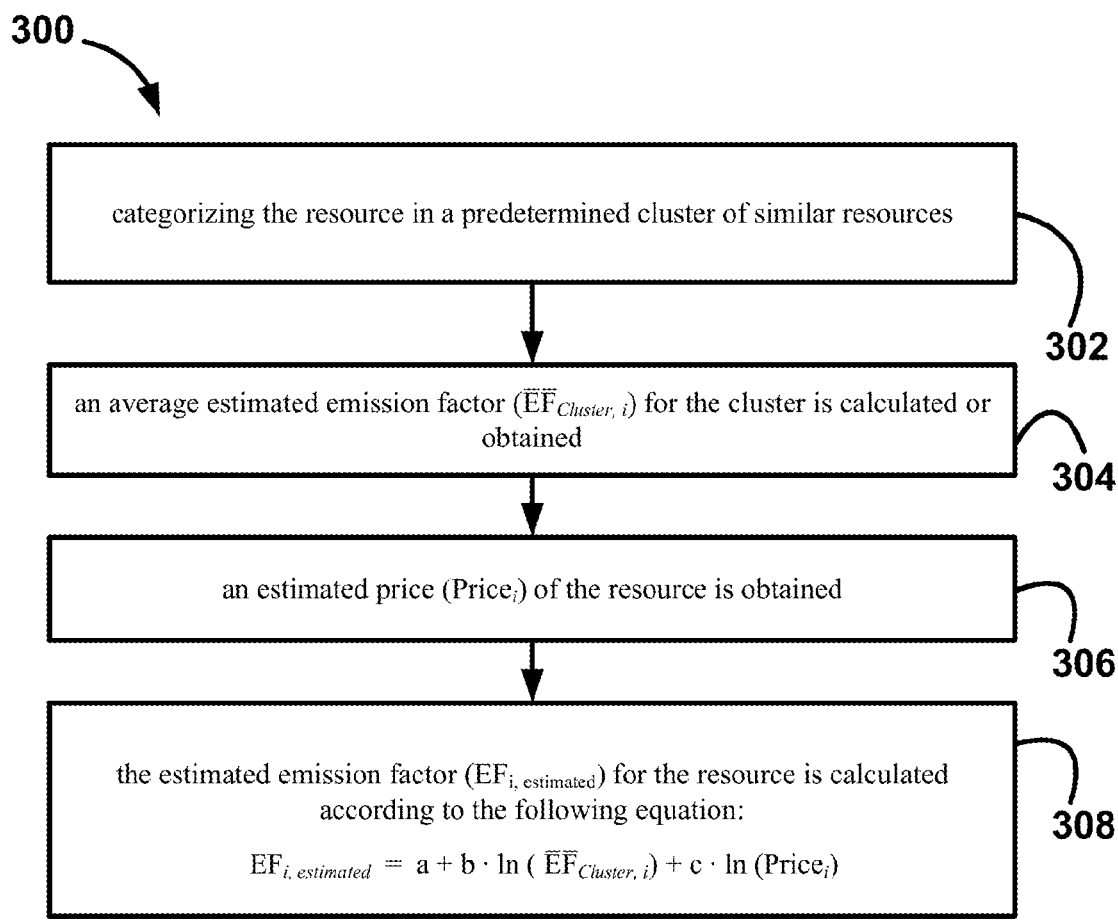
FIG. 3 is a chart of computer-executable instructions according to some embodiments of the disclosed subject matter.

Referring now to FIG. 3, some embodiments of the disclosed subject matter include computer-executable instructions 300 for estimating an emission factor for a resource such at a material or activity expended or undertaken in the manufacture, generation, or acquisition of an item. Instructions 300 are typically in the form of a software program provided as a computer-readable medium. At 302, in some embodiments, instructions 300 include categorizing the resource in a predetermined cluster of similar resources. At 304, an average estimated emission factor ($\overline{EF}_{Cluster,i}$) for the cluster is calculated or obtained. At 306, an estimated price ($Price_i$) of the resource is obtained. In some embodiments, the $\overline{EF}_{Cluster,i}$ and $Price_i$ are automatically obtained from an enterprise resource planning program database. At 308, the estimated emission factor ($EF_{i,estimated}$) for the resource is calculated according to the following equation:

$$EF_{i,estimated}=a+b\cdot\ln(\overline{EF}_{Cluster,i})+c\cdot\ln(Price_i);$$

$EF_{i,estimated}$ denotes the model-generated EF for the material i (in g $CO_2$e per g);
a, b, and c denote the three coefficients that are calibrated/optimized;
$\overline{EF}_{Cluster,i}$ denotes the average of all known EFs that share the same cluster as material i; and
$Price_i$ denotes the price of material i (in USD per kg).

Clustering involves using the average EF of a respective cluster, i.e., sorted group of like data, as an approximate EF for the material/process in question. In one analysis, when approximating each of 1758 EFs in with the average EF of the respective cluster, the CV of the thus estimated EFs ranged from 0% to 476% (depending on the cluster). The average of the CVs of all 77 clusters was 91%.

In some embodiments of a software program including instructions 300, a user manually enters a few characteristics of the material or process, and the program generates an estimated EF. In other embodiments, the characteristics required as inputs to the model are chosen such that they are automatically available through a company's ERP system or similar data warehouses, e.g., material type, price, etc. In such embodiments, manual intervention to determine EFs is longer required. Regardless, a user retains insight into the accuracy of the fully automatically generated CFs via a concurrent uncertainty analysis.

In some embodiments, software programs including instructions 300 are "trained" using the thousands of known EFs from LCA studies and public or commercial EF databases. Significant amounts of meta data such as geography, boundaries, e.g., to farm, to gate, in/excluding biogenic, etc. are also input to the software program. In some embodiments, neural network based algorithms are used to estimate EFs.

Methods and systems according to the disclosed subject matter offer benefits and advantages over known technologies. Methods and systems according to the disclosed subject matter reduce the count of required manual data entries by as much as a factor of 1000 vs. current practice, depending on how much data can be imported from ERP systems or similar data warehouses.

In comparison with current CF practice, which are usually manual, product-by-product calculations in multiple, non-interlinked spreadsheets, methods and systems according to the disclosed subject matter offer at least the following advantages:

(1) Scalability: CF for hundreds or thousands of products is currently simply impossible short of a massive buildup of a company's dedicated personnel and LCA expertise. Methods and systems according to the disclosed subject matter make the process scalable to a company's global product/service portfolio. Linking the CF to automatic ERP/data warehouse uploads, with, for example, quarterly updates, also allow companies to keep footprints current. Any changes in factory energy usage or raw material consumptions, e.g., less spill, are captured in the next round of footprints, without requiring manual updates.

(2) Transparency: The concurrent uncertainty analysis assists a user in improving overall speed and accuracy, by identifying those input data that currently contribute the most to the uncertainty of the CF result in question. The uniform structure of drivers and algorithms assist the practitioner in comparing CFs, including the traditionally difficult analysis of changes in baseline vs. actual CF and detailed product or process comparisons of two CFs with overlapping error margins.

(3) Carbon management and cost/benefit evaluations: Knowing CFs for all products, including breakdowns by LCA stages, allows "slicing and dicing" the CFs for the company's global portfolio in any desired way including national roll-ups, by product type, by business line and break-downs of the company's total product CF, e.g., by packaging, transportation, disposal, etc. Carbon reduction strategies such as light-weighting the packaging, substituting purchased goods with low-carbon alternatives, improving distribution and transportation efficiency, etc. can be evaluated instantly, and the resulting changes in GHG emissions can be compared with the estimated investment costs of the initiative.

(4) Certification and communication with eco-labeling groups: Input data and algorithmic details such as allocation rules are transparent and such that the resulting CF for individual products are easily certifiable, based on system-generated, detailed reports.

(5) Synergies with corporate GHG reporting, especially scope 3: Product/service CF and corporate GHG reporting (scopes 1, 2, and 3) are often performed as separate efforts, by different teams, and with different datasets. Methods and systems according to the disclosed subject matter can unlock important synergies between the two reporting efforts.

(6) Low regulatory risk: Because specific CF algorithms operate in parallel to all inventory data, on an integrated platform, any changes to the CF "accounting rules", e.g., treatment of recycling, can easily be implemented by adjusting respective parts of the software code.

In typical CF and wider LCA studies, uncertainty analysis, if included at all, is carried out only after all data have been collected and the footprint quantified. Methods and systems according to the disclosed subject matter use analytic error propagation carried out concurrently with all data entry and CF calculations. This approach provides, at any point in time, full transparency into (i) the uncertainty (standard deviation) of the calculated results and (ii) which input data contributes how much to the uncertainty of each CF, thus facilitating a more focused and efficient effort to improve data quality in the overall system. Concurrent uncertainty analysis points a user to those activity data or EFs where additional data or improved accuracy would most improve the accuracy of the calculated footprints. This technique uses manual entries more efficiently.

With current CF practice, carbon management analyses only become possible once all relevant product/service have been footprinted one by one. Methods and systems according to the disclosed subject matter accelerates this, by focusing on entering data that the system can use for many products simultaneously, e.g., number of days of refrigeration of all beverage products in a certain country, even if the data may not yet have the desired accuracy. Hence, additional time spent on data entry, e.g., for those data items that are not automatically loaded from ERP systems, is used to increase the accuracy of all CFs and reporting analyses, rather than the cumulative number of individual products that have been footprinted. Concurrent uncertainty analyses quantify the remaining uncertainty, for an individual CF, for a roll-up of CFs, or for specific reports. For example, a practitioner may find that the report "what is the relative contribution of PET to our overall CF across all products" can already be performed, to sufficient accuracy, before specific refrigeration times have been entered for every product individually (because the contribution of the refrigeration activity to the uncertainty of the overall CF may be small).

Methods and systems according to the disclosed subject matter enable multi-user input. For example, one user may improve the accuracy of a certain EF (by updating from the system-provided to a more bespoke/primary value) while, at the same time, another practitioner simultaneously updates the aluminum recycling rate in China. The system then simultaneously updates the CFs of all products that require one or both of these inputs, thus minimizing overall required resources.

A single, uniform data structure is used for all products/services. A uniform data structure is particularly advantageous for at least three reasons. First, comparability is different from accuracy. Suppose we review the CFs of two "competing" products, one 10% smaller than the other, but both with a margin of error (standard deviation) of ±20% (often referred to as "overlapping error margins"). While we may not know the true, absolute CF of either (only to within ±20%), there will still be many such situations where we can say with certainty that one CF is definitely smaller than the other (and thus the product or associated supply chain preferable in this narrow respect). For example, the 20% margin of error may be driven largely by the uncertain EF associated with the electricity consumption (CO2e per kWh); still, if the actual electricity consumption by product A is significantly (e.g., $p<0.05$) smaller than that by product B (and all else being equal), then the total CF of A is significantly smaller, even though the respective margins of error overlap. A straight forward comparison, however, is possible only because (i) focusing on the electricity consumption and (ii) confirming that "all else is equal" are facilitated by a uniform data structure.

Second, data amount and accuracy are balanced. A "one data structure fits all" framework enables CF for many products/services virtually simultaneously by looping the same, generic algorithm in the software. In one example, the data structure is such that it uniformly quantifies GHG emissions for (road) transportation of a product from factory to market as a single "leg", e.g., EF multiplied by transported mass multiplied by distance. This enables, for example, the use of estimated "distance to market" parameters that are used as default input data for all products in a certain region, so that a CF can be estimated even if a product-specific distance has not yet been entered into the software. In essence, this enables using a single data entry across hundreds and thousands of appropriate products, thus reducing the volume of required data entry. Third, a uniform data structure provides meaningful reporting and reduction analysis.

A uniform data structure enables integrated reporting across hundreds or thousands of products/services. For example, what is the GHG contribution of making the purchased goods vs. transporting them to the company's plants? What is the GHG reduction potential—cumulative across all affected products—if these goods were sourced more locally or transported by rail vs. road? Such analyses are easier to carry out if the CF of every product follows the same taxonomy of life cycle stages and input data.

There is a direct relationship and hence synergies between the various LCA stages that count towards a product/service CF and corporate carbon accounting. These synergies are readily exploitable only if the LCA taxonomy in the footprinting model has been set up accordingly and is applied universally across all products/services. For example, the energy consumed during the "production" phase of a product CF also contributes to scopes 1 and 2 of the corporate footprint. Using methods and systems according to the disclosed subject matter, factory energy consumption data has to be collected only once, and can then be used both for scope 1 of corporate carbon accounting and for the "production" portion of the product/service CF (followed by allocation to individual products). Similarly, the cradle-to-gate portion of a full product CF counts toward the scope 3 emissions of a customer's corporate footprint. Therefore, any company that has quantified its products' CFs can report the same results when approached by its corporate customers for scope 3-relevant information. The company merely has to exclude the contributions from LCA phases "distribution and retail", "use phase", and "disposal" to convert the CFs from cradle-to-grave to cradle-to-gate (and possibly adjust the outbound transportation phase from "plant-to-retailer" to "plant-to-customer").

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A non-transitory computer storage media encoded with computer program instructions that, when executed by one or more processors, cause a computer device to perform operations for determining the carbon footprint of an item, said operations comprising:
    obtaining data related to predetermined resources associated with an item from predetermined data sources;
    categorizing each of said predetermined resources in a predetermined cluster of similar resources;
    obtaining an average estimated emission factor ($\overline{EF}_{Cluster,i}$) for each of said predetermined clusters;
    obtaining an estimated price ($Price_i$) of each of said predetermined resources; and
    calculating said emission factor ($EF_i$, estimated) for each of said predetermined resources according to the following $$EF_{i,estimated} = a + b \cdot \ln(\overline{EF}_{Cluster,i}) + c \cdot \ln(Price_i);$$

wherein a, b, and c are calibrated/optimized coefficients; and
    utilizing both data related to said predetermined resources and said estimated emission factors of said predetermined resources to determine a carbon footprint of said item.

2. The computer storage media according to claim 1, further comprising:
    determining a contributory uncertainty of each of said data and a contributory uncertainty of each of said emission factors; and
    guiding a user based on a comparison of said respective contributory uncertainty of each of said data and each of said emission factors.

3. The computer storage media according to claim 2, further comprising:
    prompting a user to enter additional data related to said resources or emission factors of said resources based on a comparison of said respective contributory uncertainty of each of said data related to predetermined resources and each of said emission factors.

4. The computer storage media according to claim 3, further comprising:
    sorting said data related to said resources and said additional data into predetermined tables of data in accordance with a uniform data structure.

5. The computer storage media according to claim 2, further comprising:
    automatically obtaining or generating additional data related to said resources or emission factors of said resources based on a comparison of said respective contributory uncertainty of each of said data related to predetermined resources and each of said emission factors;
    determining a contributory uncertainty of each of said additional data;
    utilizing each of said additional data to determine a carbon footprint based on a comparison of said contributory uncertainty of each of said data related to predetermined resources and said contributory uncertainty of each of said additional data.

6. The computer storage media according to claim 1, wherein said item is a product or service.

7. The computer storage media according to claim 1, wherein said resources are materials and activities.

8. The computer storage media according to claim 1, further comprising:
    providing predetermined emission factors for a portion of said resources; and
    utilizing data related to said resources, said estimated emission factors of said resources, and predetermined emission factors for a portion of said resources to determine a carbon footprint of said item.

9. The computer storage media according to claim 8, further comprising:
    sorting said data related to said resources and said predetermined emission factors for a portion of said resources into predetermined tables of data in accordance with a uniform data structure.

10. The computer storage media according to claim 1, further comprising:
    mapping automated data feeds to an enterprise resource planning program database, wherein said automated data feeds are at least one of said predetermined data sources.

11. The computer storage media according to claim 10, further comprising:
    calculating said emission factors of said resources using said data obtained by said automated data feeds.

12. The computer storage media according to claim 10, wherein mapping automated data feeds includes using fuzzy logic to identify particular data in said enterprise resource planning program database.

13. The computer storage media according to claim 1, further comprising:
    sorting said data obtained into predetermined tables of data in accordance with a uniform data structure.

14. A non-transitory computer-readable medium having computer-executable instructions for estimating an emission factor for a resource, said instructions comprising:
    categorizing a resource in a predetermined cluster of similar resources;

obtaining an average estimated emission factor ($\overline{EF}_{Cluster,i}$) for said cluster;

obtaining an estimated price ($Price_i$) of said resource; and calculating said emission factor ($EF_{i,estimated}$) for said resource according to the following $$EF_{i,estimated} = a + b \cdot \ln(\overline{EF}_{Cluster,i}) + c \cdot \ln(Price_i);$$

wherein a, b, and c are calibrated/optimized coefficients.

15. The non-transitory computer-readable medium according to claim 14, wherein said resource is a material or activity.

16. The non-transitory computer-readable medium according to claim 14, wherein one or more of said $Price_i$ and data used to identify said $\overline{EF}_{Cluster,i}$ are automatically obtained from an enterprise resource planning program database.

* * * * *